United States Patent [19]
Kitaura et al.

[11] Patent Number: 5,528,533
[45] Date of Patent: Jun. 18, 1996

[54] DCT/INVERSE DCT ARITHMETIC UNIT USING BOTH OF A FIRST AND SECOND DIFFERENT ALGORITHM TO THEREBY PROVIDE AN IMPROVED COMBINATION OF SPEED AND ACCURACY

[75] Inventors: Aoi Kitaura, Tenri; Kenji Kawahara, Nara, both of Japan

[73] Assignee: Sharp Kabushiki Kaisha, Osaka, Japan

[21] Appl. No.: 539,753

[22] Filed: Oct. 6, 1995

Related U.S. Application Data

[63] Continuation of Ser. No. 207,144, Mar. 8, 1994, abandoned.

[30] Foreign Application Priority Data

Mar. 12, 1993 [JP] Japan .................................... 5-052004

[51] Int. Cl.⁶ ........................................................ G06F 7/38
[52] U.S. Cl. ........................................................ 364/725
[58] Field of Search ..................................... 364/725–726; 382/280

[56] References Cited

U.S. PATENT DOCUMENTS 5,268,853  12/1993  Tamaka et al. ..................... 364/725
5,276,784   1/1994  Ohki .................................... 364/725 X

OTHER PUBLICATIONS

"A New Algorithm to Compute the Discrete Cosine Transform", Lee et al., IEEE Transactions on Acoustics, Speech and Signal Processing, ASSP–32, No. 6, pp. 1243–1245, Dec. 1984.

*Primary Examiner*—Tan V. Mai

[57] ABSTRACT

In a DCT (discrete cosine transformation)/inverse DCT arithmetic unit, data of an inputted image are inputted to a first one-dimensional N-th order DCT/inverse DCT arithmetic device using a first algorithm B. The first one-dimensional N-th order DCT/inverse DCT arithmetic device calculates a one-dimensional N-th order inverse DCT. Calculated results of the first one-dimensional N-th order DCT/inverse DCT arithmetic device are stored to a memory for intermediate results as intermediate results of the N-th order inverse DCT in M-dimensions. Similarly, a second one-dimensional N-th order DCT/inverse DCT arithmetic device calculates a one-dimensional N-th order inverse DCT using a second algorithm A, with stored data of the memory for intermediate results as an input. Calculated results of the second one-dimensional N-th order DCT/inverse DCT arithmetic device are outputted to the memory for intermediate results. Similarly, an M-th one-dimensional N-th order DCT/inverse DCT arithmetic device calculates a one-dimensional N-th order DCT/inverse DCT. Calculated results finally obtained by the M-th one-dimensional N-th order DCT/inverse DCT arithmetic device are set as output data, This DCT/inverse DCT arithmetic unit has a high arithmetic operation speed and a high arithmetic accuracy.

9 Claims, 5 Drawing Sheets

DCT/INVERSE DCT ARITHMETIC UNIT USING BOTH OF A FIRST AND SECOND DIFFERENT ALGORITHM TO THEREBY PROVIDE AN IMPROVED COMBINATION OF SPEED AND ACCURACY

This application is a continuation of application Ser. No. 08/207,144, filed on Mar. 8, 1994, now abandoned.

BACKGROUND OF THE INVENTION

1. Field of the Invention

The present invention relates to an arithmetic unit for performing a multidimensional discrete cosine transformation (DCT) or inverse discrete cosine transformation (inverse DCT). More particularly, the present invention relates to an arithmetic unit of a discrete cosine transformation (DCT)/inverse discrete cosine transformation (inverse DCT) included in an encoder and a decoder of image data.

2. Description of the Related Art

A discrete cosine transformation (DCT) is often used to compress image information since a method for processing the image information is simple in the discrete cosine transformation.

DCT and inverse DCT of an N-th order in M-dimensions are provided by the following formulas (1) and (2).

Namely, the DCT of the N-th order in M-dimensions is provided by the following formula (1).

$$F(u_1, u_2, \ldots, u_M) = \left(\sqrt{\frac{2}{N}}\right)^M C(u_1)C(u_2)\ldots C(u_M) \sum_{i1=0}^{N-1} \sum_{i2=0}^{N} \ldots \sum_{iM=0}^{N-1} f(i_1, i_2, \ldots i_M) \cdot$$

$$\cos\frac{(2i_1+1)u_1\pi}{2N} \cos\frac{(2i_2+1)u_2\pi}{2N} \ldots \cos\frac{(2i_M+1)u_M\pi}{2N}$$

The inverse DCT of the N-th order in M-dimensions is provided by the following formula (2).

$$f(i_1, i_2, \ldots, i_M) = \left(\sqrt{\frac{2}{N}}\right)^M \sum_{u1=0}^{N-1} \sum_{u2=0}^{N} \ldots \sum_{uM=0}^{N-1} C(u_1)C(u_2)\ldots C(u_M)F(u_1, u_2, \ldots, u_M) \cdot$$

$$\cos\frac{(2i_1+1)u_1\pi}{2N} \cos\frac{(2i_2+1)u_2\pi}{2N} \ldots \cos\frac{(2i_M+1)u_M\pi}{2N}$$

In this case, $C(u_1), \ldots, C(u_M)$ are provided as follows.

$$C(u_1) = \begin{cases} \frac{1}{\sqrt{2}} & (u_1=0) \\ 1 & (u_1=1,\ldots,N-1) \end{cases} \ldots C(u_M) = \begin{cases} \frac{1}{\sqrt{2}} & (u_M=0) \\ 1 & (u_M=1,\ldots,N-1) \end{cases}$$

In the above formulas, $f(i_1, i_2, \ldots, i_M)$ is set to an input of the DCT or an output of the inverse DCT. $F(u_1, u_2, \ldots, u_M)$ is set to an output of the DCT or an input of the inverse DCT.

DCT and inverse DCT of an eighth order in two dimensions used for image compression are provided by the following formulas (3) and (4).

Namely, the DCT of the eighth order in two dimensions is provided by the following formula (3).

$$F(u_1, u_2) = 1/4 C(u_1)C(u_2) \sum_{i1=0}^{7} \sum_{i2=0}^{7} f(i_1, i_2)\cos\frac{(2i_1+1)u_1\pi}{16} \cos\frac{(2i_2+1)u_2\pi}{16}$$

The inverse DCT of the eighth order in two dimensions is provided by the following formula (4).

$$f(i_1, i_2) = 1/4 \sum_{u1=0}^{7} \sum_{u2=0}^{7} C(u_1)C(u_2)F(u_1, u_2)\cos\frac{(2i_1+1)u_1\pi}{16} \cos\frac{(2i_2+1)u_2\pi}{16}$$

In the case of image compression, $f(i_1, i_2)$ corresponds to a pixel value of an original image or a restored image. $F(u_1, u_2)$ corresponds to a pixel value of a compressed image.

In general, the DCT of the N-th order in M-dimensions can be realized by sequentially performing one-dimensional N-th order DCT M-times. For example, in the above two-dimensional eighth order DCT, one-dimensional eighth order DCT is first executed in a row or horizontal direction. Next, one-dimensional eighth order DCT is executed in a column or vertical direction with respect to DCT results in the row or horizontal direction. Thus, the above two-dimensional eighth order DCT can be realized. The two-dimensional eighth order DCT can be similarly realized even when the one-dimensional eighth order DCT is performed by inverting its arithmetic directional order.

Namely, the two-dimensional eighth order DCT in the above formula (3) can be decomposed into one-dimensional eighth order DCTs in row (horizontal) and column (vertical) directions as shown by the following formulas (5) and (6).

The one-dimensional eighth order DCT in the row or horizontal direction is provided by the following formula (5).

$$F^R(i_1, u_2) = 1/2C(u_2) \sum_{i2=0}^{7} f(i_1, i_2)\cos\frac{(2i_2+1)u_2\pi}{16}$$

$$(i_1, u_2 = 0, \ldots, 7)$$

The one-dimensional eighth order DCT in the column or vertical direction is provided by the following formula (6).

$$F(u_1, u_2) = 1/2C(u_1) \sum_{i1=0}^{7} F^R(i_1, u_2)\cos\frac{(2i_1+1)u_1\pi}{16}$$

$$(u_1, u_2 = 0, \ldots, 7)$$

In this case, $F^R(i_1, u_2)$ $(i_1, u_2=0, ---, 7)$ shows an output value of a row transformation.

The above formulas (5) and (6) are also formed with respect to the inverse DCT.

For example, the following calculating methods are well known as an arithmetic method of the DCT and inverse DCT of the eighth order in one dimension.

(1) In a first arithmetic method, arithmetic or calculating formulas of the DCT and inverse DCT of the eighth order in one dimension are used as they are. In the following description, this first arithmetic method is called algorithm A.

(2) In a second arithmetic method, a high speed algorithm is used. This second arithmetic method is called algorithm B.

For example, the algorithm B uses a Lee system used for some of a DCT-dedicated LSI in development of other companies. As a reference literature, see Lee B. G, "A New Algorithm to Compute the Discrete Cosine Transform," IEEE Transactions on Acoustics, Speech, and Signal Processing, ASSP-32, no. 6, pp 1245–1245, December 1984.

In a general technique, the DCT and inverse DCT of the N-th order in M-dimensions are realized by repeatedly performing the DCT and inverse DCT of the N-th order in one dimension using the same arithmetic algorithm.

When an arithmetic unit of the DCT and inverse DCT of the N-th order in M-dimensions is realized by hardware, an error in arithmetic or calculated results is caused by truncation of intermediate results. This arithmetic error will next be described, particularly in the case of a two-dimensional eighth order inverse DCT used in an image compressing technique.

A mean square error is used as an evaluation value of an arithmetic accuracy when random numbers in a range from −258 to 255 are generated by 10,000 blocks in accordance with an evaluating method of an inverse DCT arithmetic accuracy prescribed in a coding system H.281 for a visual telephone and a television conference advised by Consultative Committee of International Telegraph Telephone (CCITT).

The mean square error in the entire blocks is provided as an average by the following formula (7).

$$S = \frac{1}{64} \cdot \frac{1}{10000} \sum_{ia=1}^{64} \sum_{b=1}^{10000} (X_b^a - \overline{X}_b^a)^2$$

$X_b^a$=evaluation value, a: a pixel number from 1 to 84 within a block $\overline{X}_b^a$=reference value, b: a block number from 1 to 10000

The number of arithmetic or calculating operations is set to a number obtained by adding the number of multiplying operations and the number of adding operations to each other when the two-dimensional eighth order inverse DCT is calculated.

When the algorithm A is used in both the column and row directions, the number of arithmetic operations is equal to 128 (generally $2N^2$) and an arithmetic or calculating accuracy is equal to 0.005.

When the algorithm B is used in both the column and row directions, the number of arithmetic operations is equal to 41 (generally $2N\log_2 N - N + 1$) and the arithmetic accuracy is equal to 0.013.

In the inverse DCT calculation, a multiplier of 16 bits and an adder of 32 bits are used. Calculated results of the one-dimensional eighth order inverse DCT in the column direction are rounded to 16 bits. Calculated results (IDCT results) of the one-dimensional eighth order inverse DCT in the row direction are rounded to 9 bits. The above evaluation is performed with respect to these rounded results.

When the DCT and inverse DCT of the N-th order in multiple dimensions are performed by repeating the DCT and inverse DCT of the N-th order in one dimension using the same arithmetic algorithm as in the general technique, the arithmetic accuracy is high, but the number of arithmetic operations is large when the algorithm A is used in the DCT and inverse DCT of the N-th order in one dimension. Accordingly, an arithmetic operation speed is slow in this case. In contrast to this, when the algorithm B is used in the DCT and inverse DCT of the N-th order in one dimension, the number of arithmetic operations is small so that the arithmetic operation speed is fast, but the arithmetic accuracy is low.

SUMMARY OF THE INVENTION

It is therefore an object of the present invention to provide a DCT/inverse DCT arithmetic unit having a high arithmetic operation speed and a high arithmetic accuracy.

The above object of the present invention can be achieved by a DCT/inverse DCT arithmetic unit in M-dimensions with respect to $N^M$ elements for performing a one-dimensional DCT/inverse DCT operation M-times, the DCT/inverse DCT arithmetic unit comprising M-one-dimensional DCT/inverse DCT arithmetic means for performing the one-dimensional DCT/inverse DCT operation by plural kinds of different arithmetic algorithms; and a memory for intermediate results for storing one-dimensional DCT/inverse DCT arithmetic results in each of M-one-dimensional DCT/inverse DCT operations.

In the multidimensional DCT/inverse DCT arithmetic unit of the present invention, the one-dimensional DCT/inverse DCT operation is performed M-times by using plural kinds of different arithmetic algorithms. An arithmetic operation speed of the DCT/inverse DCT arithmetic unit is increased in comparison with a case in which only the algorithm A is used. Further, an arithmetic accuracy of the DCT/inverse DCT arithmetic unit is increased in comparison with a case in which only the algorithm B is used.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a DCT/inverse DCT arithmetic unit in the present invention will next be described in detail with reference to the accompanying drawings.

Figure 1:
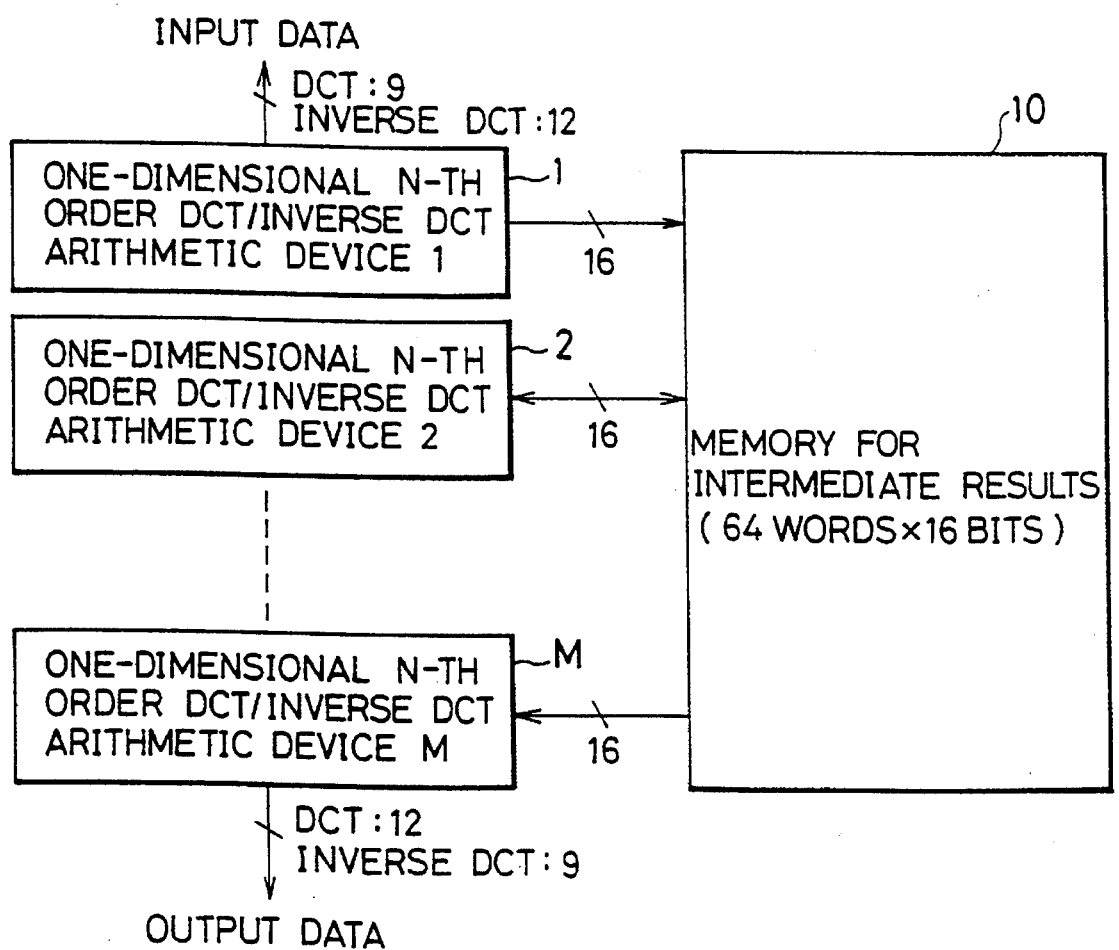
FIG. 1 is a block diagram showing the basic construction of an arithmetic unit of DCT/inverse DCT of an N-th order in M-dimensions in accordance with one embodiment of the present invention.

FIG. 1 is a block diagram showing the basic construction of an arithmetic unit of DCT/inverse DCT of an N-th order in M-dimensions in the present invention. In FIG. 1, each of reference numerals 1 to M designates an arithmetic device of DCT/inverse DCT of the N-th order in one dimension using plural kinds of arithmetic algorithms. Reference numeral 10 designates a memory for storing intermediate results of the one-dimensional N-th order DCT/inverse DCT arithmetic device.

Figure 2:
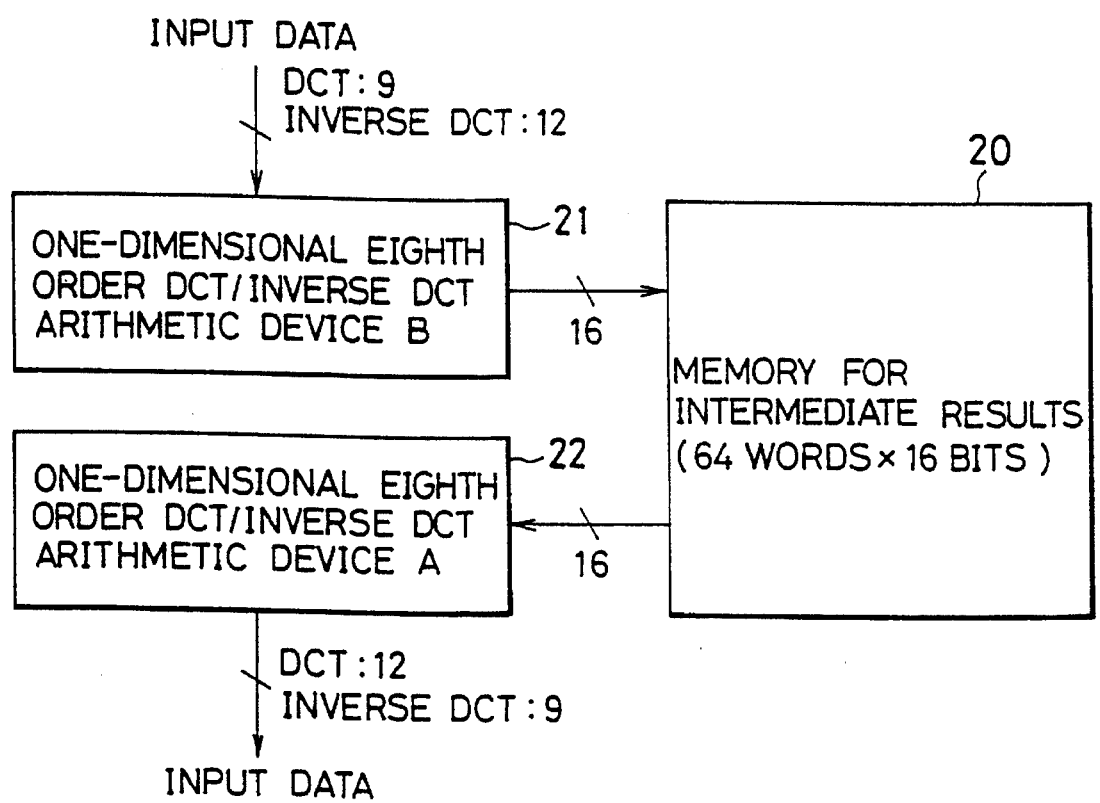
FIG. 2 is a block diagram showing the basic construction of an arithmetic unit of DCT/inverse DCT of an eighth order in two dimensions in accordance with one embodiment of the present invention.

FIG. 2 is a block diagram showing the basic construction of an arithmetic unit of DCT/inverse DCT of an eighth order in two dimensions as one constructional example of the multidimensional N-th order DCT/inverse DCT arithmetic unit shown in FIG. 1. In FIG. 2, reference numeral 21 designates a DCT/inverse DCT arithmetic device B of the eighth order in one dimension using an arithmetic algorithm B. Reference numeral 22 designates a DCT/inverse DCT arithmetic device A of the eighth order in one dimension using an arithmetic algorithm A. Reference numeral 20 designates a memory for storing intermediate results of the one-dimensional eighth order DCT/inverse DCT arithmetic device 21.

An output portion of the one-dimensional eighth order DCT/inverse DCT arithmetic device 21 is connected to an input portion of the memory 20 for storing the intermediate results. An output portion of the memory 20 for the intermediate results is connected to an input portion of the one-dimensional eighth order DCT/inverse DCT arithmetic device 22.

Figure 3:
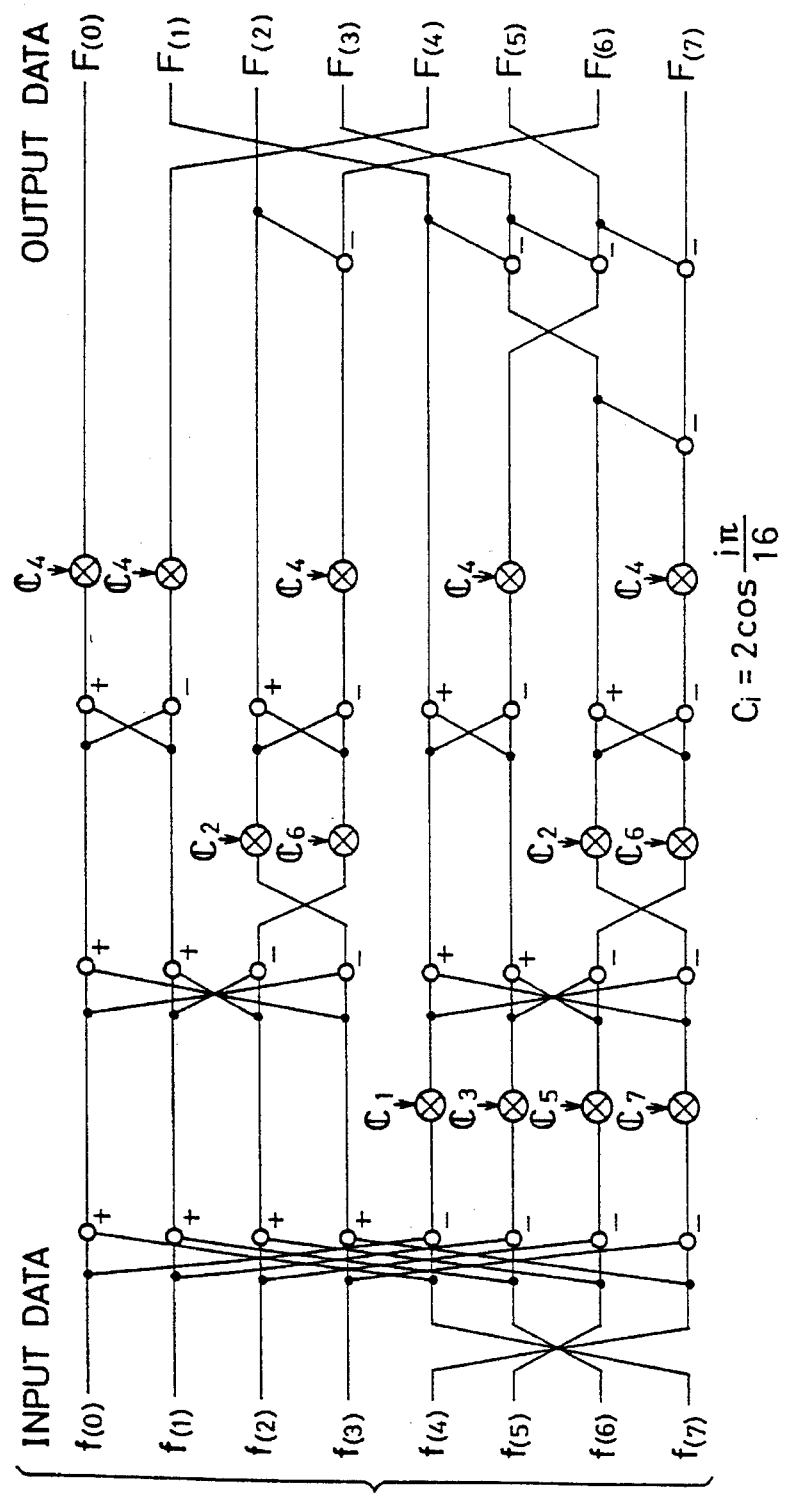
FIG. 3 is a data flow diagram of internal signals of a one-dimensional eighth order DCT/inverse DCT arithmetic device B.
Figure 4:
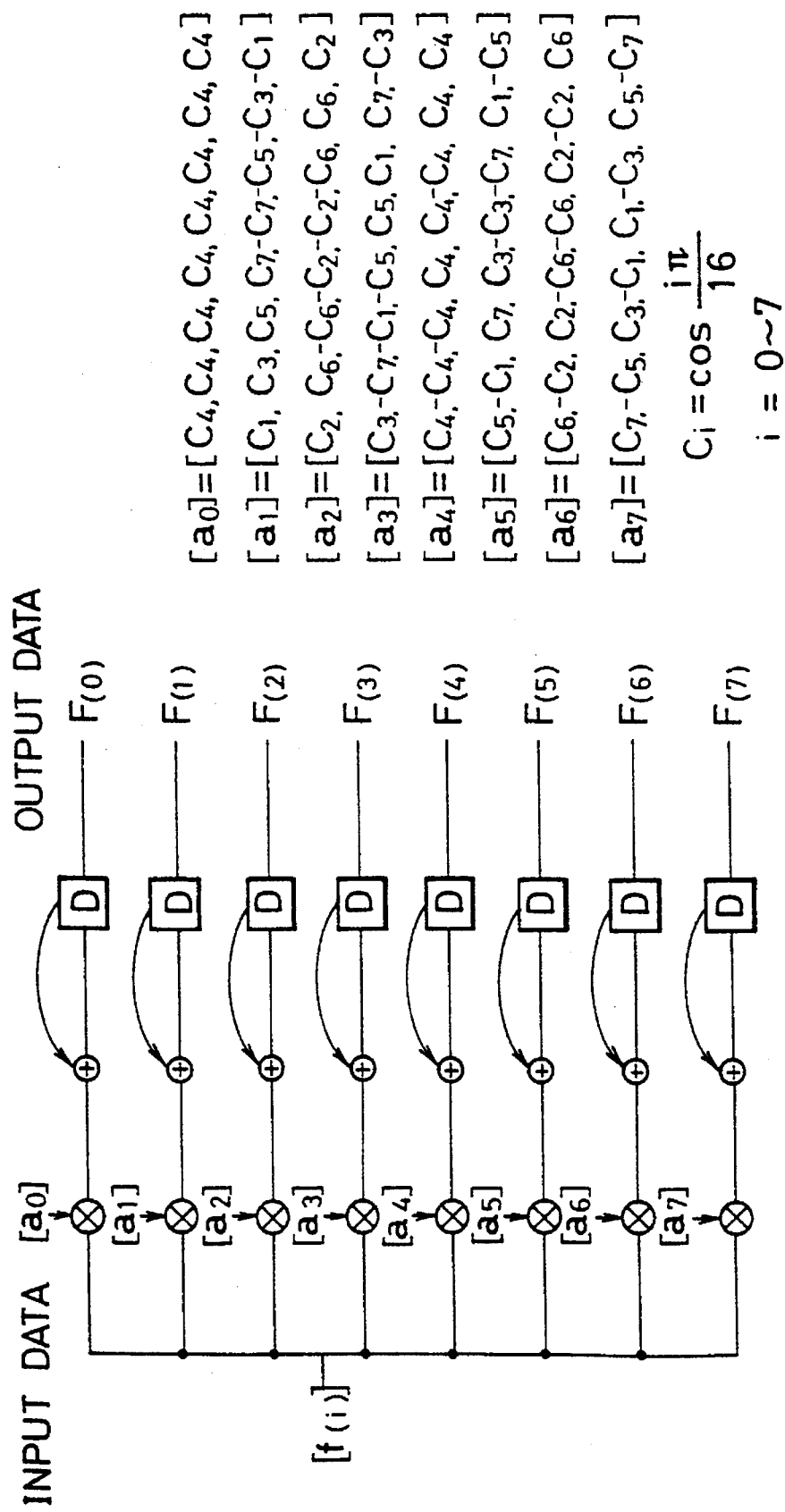
FIG. 4 is a data flow diagram of internal signals of a one-dimensional eighth order DCT/inverse DCT arithmetic device A.
Figure 5:
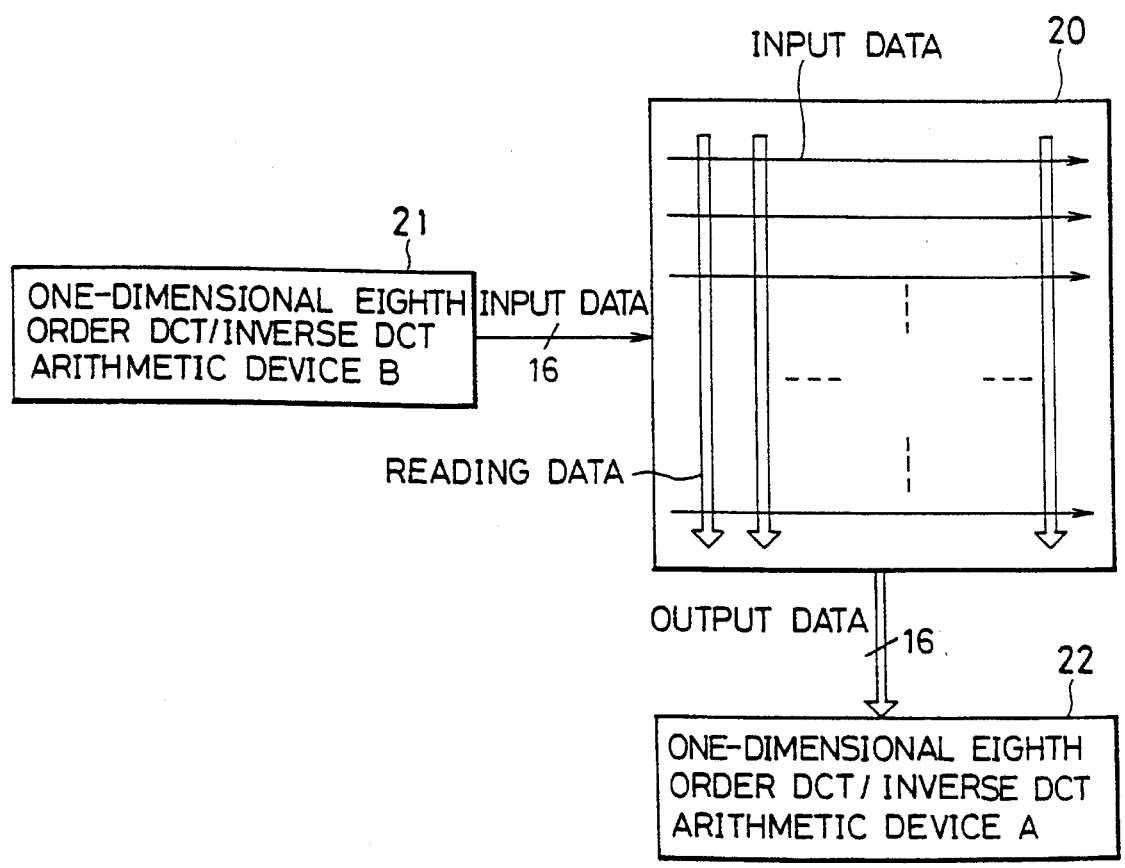
FIG. 5 is a data flow diagram of internal signals of a memory for intermediate results.

FIG. 3 is a data flow diagram of internal signals of the one-dimensional eighth order DCT/inverse DCT arithmetic device 21. FIG. 4 is a data flow diagram of internal signals of the one-dimensional eighth order DCT/inverse DCT arithmetic device 22. FIG. 5 is a data flow diagram of internal signals of the memory 20 for storing the intermediate results.

An arithmetic or calculating operation of the inverse DCT of the eighth order in two dimensions will next be explained.

In FIG. 2, data of an inputted image are inputted to the one-dimensional eighth order DCT/inverse DCT arithmetic device 21 using the algorithm B. The one-dimensional eighth order DCT/inverse DCT arithmetic device 21 then calculates the inverse DCT of the eighth order in one dimension in a column direction with respect to the inputted image data. Calculated results of the one-dimensional eighth order DCT/inverse DCT arithmetic device 21 are stored to the memory 20 for the intermediate results as intermediate results of the inverse DCT of the eighth order in two dimensions. Data stored to the memory 20 for the intermediate results are inputted to the one-dimensional eighth order DCT/inverse DCT arithmetic device 22 as input data $f^c$. The one-dimensional eighth order DCT/inverse DCT arithmetic device 22, using the algorithm A, calculates the inverse DCT of the eighth order in one dimension in a row direction. Calculated results obtained by the one-dimensional eighth order DCT/inverse DCT arithmetic device 22 are set as output data.

In this embodiment, the one-dimensional eighth order inverse DCT is first calculated by using the algorithm B and is next calculated by using the algorithm A. However, a sequential order of the used algorithms may be reversed. In this reversed sequential order, the one-dimensional eighth order inverse DCT is first calculated by using the algorithm A and is next calculated by using the algorithm B.

In this case, an accuracy in intermediate result data stored to the memory for intermediate results using the algorithm A is improved in comparison with that using the algorithm B so that an arithmetic accuracy in finally calculated results tends to be slightly improved.

The number of arithmetic operations (or calculations) and an arithmetic accuracy in the two-dimensional eighth order inverse DCT operation in this embodiment will next be compared with those achieved by the general technique.

The number of arithmetic operations and the arithmetic accuracy are respectively 128 and 0.005 when the algorithm A is used in both the row and column directions.

The number of arithmetic operations and the arithmetic accuracy are respectively 41 and 0.013 when the algorithm B is used in both the row and column directions.

The number of arithmetic operations and the arithmetic accuracy are respectively 84 and 0.008 when the algorithm A is used in the row direction and the algorithm B is used in the column direction.

The number of arithmetic operations and the arithmetic accuracy are respectively 84 and 0.010 when the algorithm B is used in the row direction and the algorithm A is used in the column direction.

As can be seen from the two-dimensional eighth order DCT/inverse DCT arithmetic unit shown as one example in this embodiment, the DCT/inverse DCT arithmetic unit in the present invention has the following features.

(1) The DCT/inverse DCT arithmetic unit in the present invention has an arithmetic time shorter than that obtained by using only the algorithm A.

(2) The DCT/inverse DCT arithmetic unit in the present invention has an arithmetic accuracy higher than that obtained by using only the algorithm B.

Further, an arithmetic operation speed and the arithmetic accuracy of the DCT/inverse DCT arithmetic unit in the present invention are higher than those in the general technique. When the algorithm A is used in the row direction and the algorithm B is used in the column direction, the arithmetic accuracy of the DCT/inverse DCT arithmetic unit is high in comparison with a case in which the algorithm B is used in the row direction and the algorithm A is used in the column direction.

The above description relates to effects of the present invention in the two-dimensional inverse DCT operation or calculation. The effects of the present invention can obviously be obtained in comparison with the general technique as the number of dimensions is increased. Accordingly, it is possible to perform the DCT/inverse DCT operation at a high speed with high accuracy.

As mentioned above, the DCT/inverse DCT arithmetic unit in the present invention has M-one-dimensional DCT/inverse DCT arithmetic means for performing a one-dimensional DCT/inverse DCT operation by plural kinds of different arithmetic algorithms. The DCT/inverse DCT arithmetic unit in the present invention also has a memory for intermediate results for storing one-dimensional DCT/inverse DCT arithmetic results in each of M-one-dimensional DCT/inverse DCT operations. Accordingly, it is possible to provide a DCT/inverse DCT arithmetic unit having a high arithmetic operation speed and a high arithmetic accuracy.

Many widely different embodiments of the present invention may be constructed without departing from the spirit and scope of the present invention. It should be understood that the present invention is not limited to the specific embodiments described in the specification, except as defined in the appended claims.

What is claimed is:

1. A DCT/inverse DCT arithmetic unit in M-dimensions with respect to $N^M$ elements for performing a one-dimensional DCT/inverse DCT operation M-times, N being an integer and M being an integer greater than 1, the DCT/inverse DCT arithmetic unit comprising:

M-one-dimensional DCT/inverse DCT arithmetic means, each of the M-one-dimensional DCT/inverse DCT arithmetic means for performing the one-dimensional DCT/inverse DCT operation in a different dimension with a selected one of a plurality of different arithmetic algorithms; and a memory for storing intermediate results for storing one-dimensional DCT/inverse DCT arithmetic results for each of first to (M−1)th one-dimensional DCT/inverse DCT operations, input data of said N-times one-dimensional DCT/inverse DCT operation being inputted to a first one-dimensional DCT/inverse DCT arithmetic means, and output data of said N-times one-dimensional DCT/inverse DCT operation being outputted from the M-th one-dimensional DCT/inverse DCT arithmetic means.

2. A DCT/inverse DCT arithmetic unit as claimed in claim 1, wherein said plurality of different arithmetic algorithms include at least an accurate algorithm and a fast algorithm, said accurate algorithm performing the one-dimensional DCT/inverse DCT operation more accurately than said fast algorithm and said fast algorithm performing the one-dimensional DCT/inverse DCT operation faster than said accurate algorithm.

3. A DCT/inverse DCT arithmetic unit in two dimensions for performing a one-dimensional DCT/inverse DCT operation two times, the DCT/inverse DCT arithmetic unit comprising:

a first one-dimensional N-th order DCT/inverse DCT arithmetic device for performing a one-dimensional DCT/inverse DCT operation with respect to input data inputted via an input portion thereof in one of first and second dimensions using one of an accurate algorithm and a fast algorithm, N being an integer;

a second one-dimensional N-th order DCT/inverse DCT arithmetic device for performing a one-dimensional DCT/inverse DCT operation in the other of the first and second dimensions using the other of said accurate algorithm and said fast algorithm, and outputting the result of said one-dimensional DCT/inverse DCT operation in the other of the first and second dimensions as output data via an output portion thereof; and a memory for storing intermediate results, an output portion of said first one-dimensional DCT/inverse DCT arithmetic device being connected to an input portion of said memory and an output portion of said memory being connected to an input portion of said second one-dimensional DCT/inverse DCT arithmetic device, said accurate algorithm performing the one-dimensional DCT/inverse DCT operation more accurately than said fast algorithm and said fast algorithm performing the one-dimensional DCT/inverse DCT operation faster than said accurate algorithm.

4. A DCT/inverse DCT arithmetic unit as claimed in claim 3, wherein said first one-dimensional N-th order DCT/inverse DCT arithmetic device uses said accurate algorithm and said second one-dimensional N-th order DCT/inverse DCT arithmetic device uses said fast algorithm.

5. A DCT/inverse DCT arithmetic unit as claimed in claim 3, wherein data of an inputted image are inputted to said first one-dimensional N-th order DCT/inverse DCT arithmetic device, said one dimension in which the first one-dimensional N-th order DCT/inverse DCT arithmetic device calculates a one-dimensional N-th order DCT/inverse DCT being a column direction.

6. A DCT/inverse DCT arithmetic unit as claimed in claim 5, wherein said other dimension in which said second one-dimensional N-th order DCT/inverse DCT arithmetic device calculates a one-dimensional N-th order DCT/inverse DCT being a row direction.

7. A DCT/inverse DCT arithmetic unit as claimed in claim 6, wherein calculated results of said second one-dimensional N-th order DCT/inverse DCT arithmetic device are output.

8. A DCT/inverse DCT arithmetic unit as claimed in claim 7, wherein N=8.

9. A DCT/inverse DCT arithmetic unit in M-dimensions with respect to $N^M$ elements for performing a one-dimensional DCT/inverse DCT operation N-times, N Being an integer and M being an integer greater than 2, the DCT/inverse DCT arithmetic unit comprising:

M-one-dimensional DCT/inverse DCT arithmetic means, each of the M-one-dimensional DCT/inverse DCT arithmetic means for performing the one-dimensional DCT/inverse DCT operation in a different dimension with a selected one of plurality of different arithmetic algorithms; and a memory for storing intermediate results for storing one-dimensional DCT/inverse DCT arithmetic results for each of first to (M−1)th one-dimensional DCT/inverse DCT operations, input data of said N-times one-dimensional DCT/inverse DCT operation being inputted to first-one-dimensional DCT/inverse DCT arithmetic means, and output data of said N-times one-dimensional DCT/inverse DCT operation being outputted from Mth-one-dimensional DCT/inverse DCT arithmetic means.

* * * * *